United States Patent
Thies et al.

(10) Patent No.: US 6,305,234 B1
(45) Date of Patent: Oct. 23, 2001

(54) ABSOLUTE ENCODER

(75) Inventors: Edward L. Thies, 8046 Chapel Rd., Niles, MI (US) 49120; William F. Dowis, Huntington Beach, CA (US)

(73) Assignee: Edward L. Thies, Niles, MI (US)

( * ) Notice: Subject to any disclaimer, the term of this patent is extended or adjusted under 35 U.S.C. 154(b) by 0 days.

(21) Appl. No.: 09/491,738

(22) Filed: Jan. 27, 2000

(51) Int. Cl.⁷ .............................. G01B 7/00; G01B 11/00; G01B 21/00
(52) U.S. Cl. ..................... 73/865.9; 250/231.18; 324/262; 356/615
(58) Field of Search .................. 73/865.9, 866.5; 324/207.11, 207.24, 207.25, 200, 262; 356/614, 615, 622; 250/231.13, 231.18, 559.29; 318/637, 652, 653

(56) References Cited

U.S. PATENT DOCUMENTS

| | | | |
|---|---|---|---|
| 3,831,169 | * 8/1974 | Raser | 250/231.13 |
| 4,274,053 | * 6/1981 | Ito | 324/174 |
| 4,329,636 | 5/1982 | Uchida et al. | 328/721 |
| 4,567,416 | 1/1986 | Brunier-Coulin | 318/602 |
| 4,827,203 | 5/1989 | Sakano | 318/667 |
| 4,849,680 | 7/1989 | Miyamoto | 318/602 |
| 4,851,771 | * 7/1989 | Ikeda et al. | 324/207.21 |
| 4,970,423 | 11/1990 | Tamae et al. | 310/162 |
| 5,254,919 | 10/1993 | Bridges et al. | 318/560 |
| 5,502,380 | * 3/1996 | Sittler et al. | 324/252 X |
| 5,506,579 | * 4/1996 | Spaulding | 250/231.18 X |
| 5,520,059 | 5/1996 | Garshelis | 73/862.335 |
| 5,589,939 | * 12/1996 | Kitajima | 250/559.29 X |
| 5,691,613 | 11/1997 | Gutwillinger | 318/500 |
| 5,821,713 | 10/1998 | Holling et al. | 318/439 |

FOREIGN PATENT DOCUMENTS

| | | | |
|---|---|---|---|
| 5-158541 | * 6/1993 | (JP) | G01B/7/00 |
| 8-233602 | * 9/1996 | (JP) | G01B/7/00 |

* cited by examiner

*Primary Examiner*—Thomas P. Noland
(74) *Attorney, Agent, or Firm*—Biebel & French

(57) ABSTRACT

A non-contact absolute encoder for determining the absolute position of a movable workpiece includes a movable transducer element adapted to be coupled to the workpiece, and a sensor positioned proximate the transducer element. The encoder may be of either the rotary or linear type. The transducer element includes a characteristic profile that varies substantially continuously as a function of the transducer position. The characteristic profile may be magnetic, optical, or some other characteristic that is measurable by a non-contact sensor and is representative of transducer position.

10 Claims, 13 Drawing Sheets

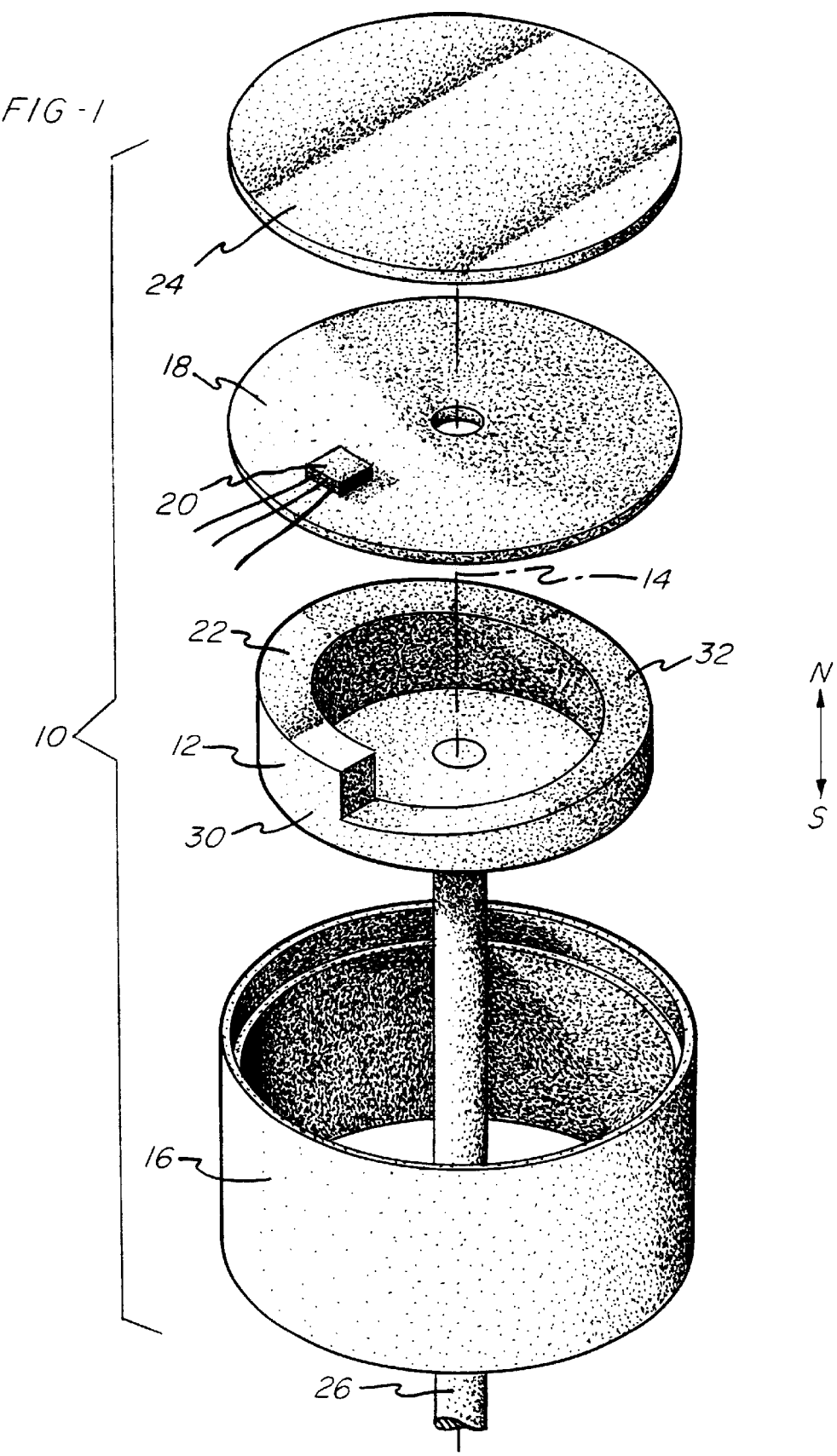

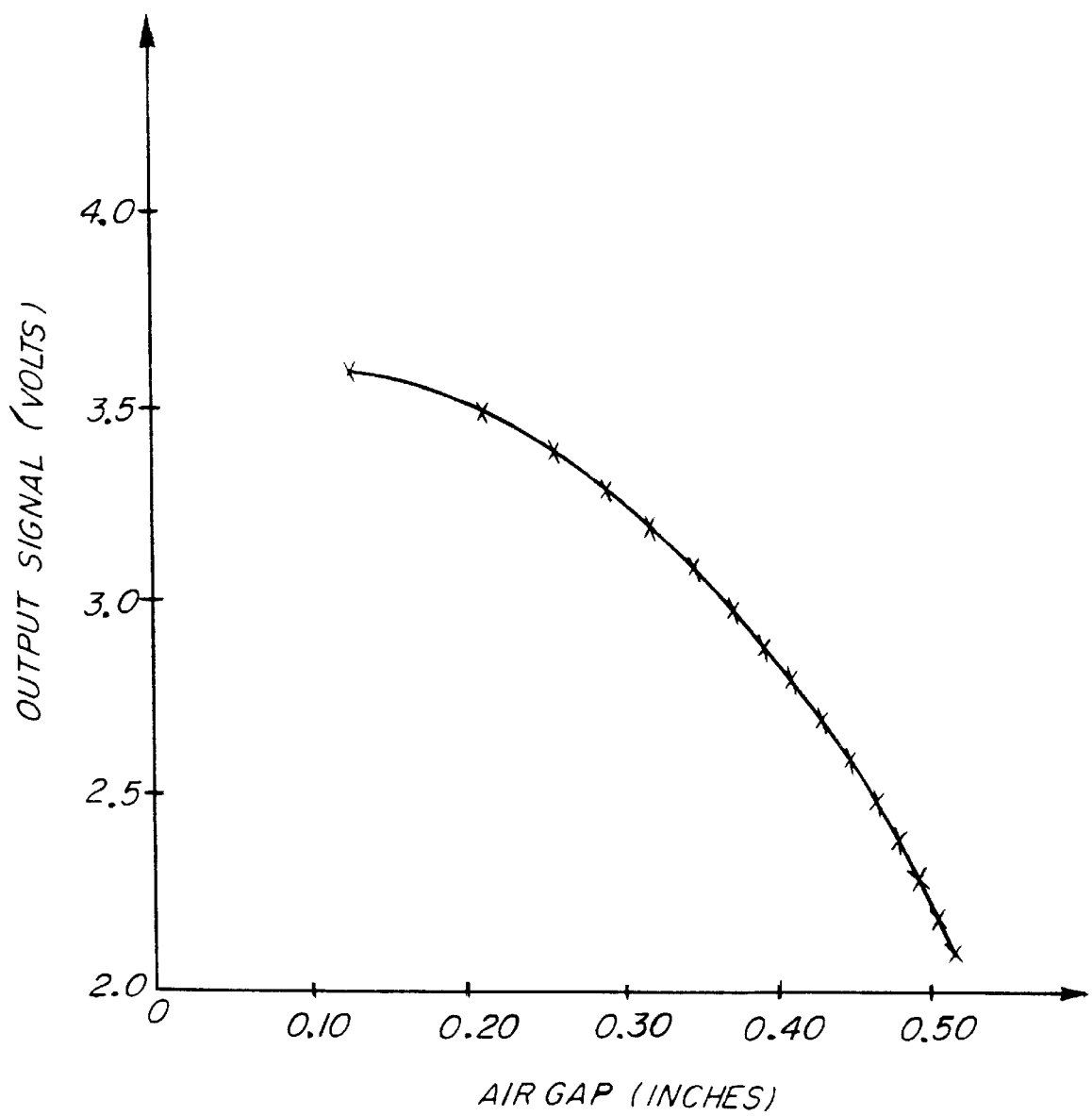

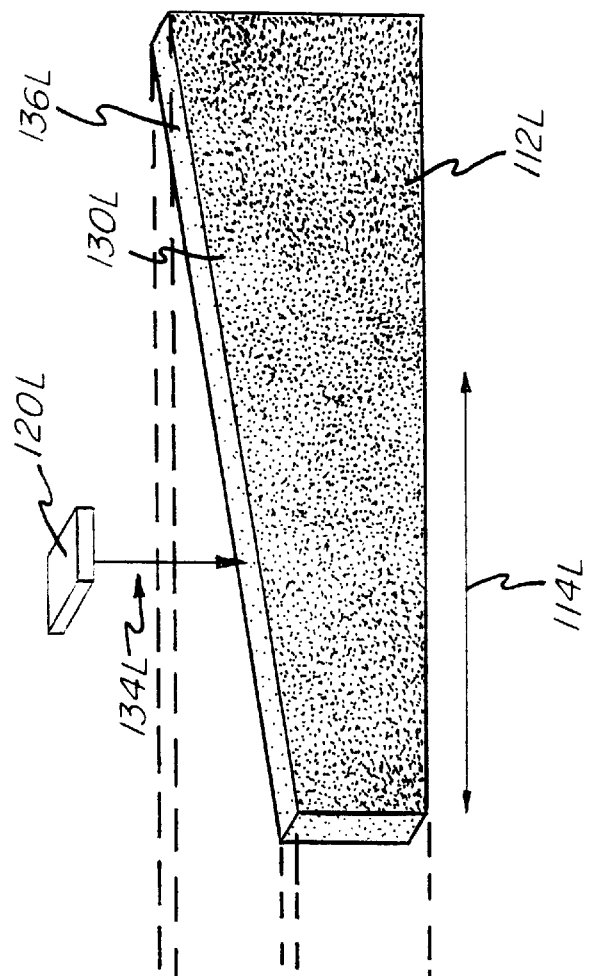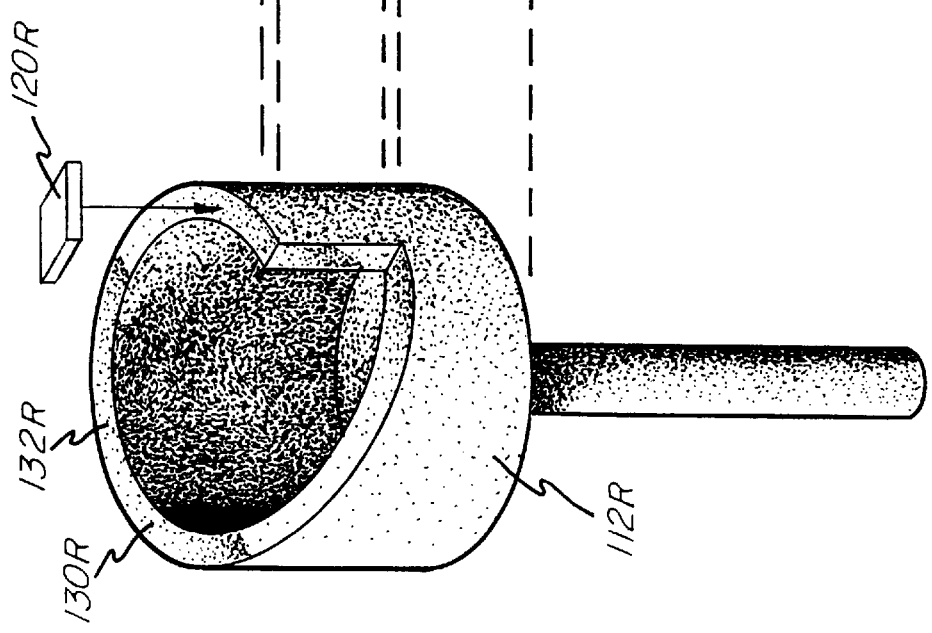

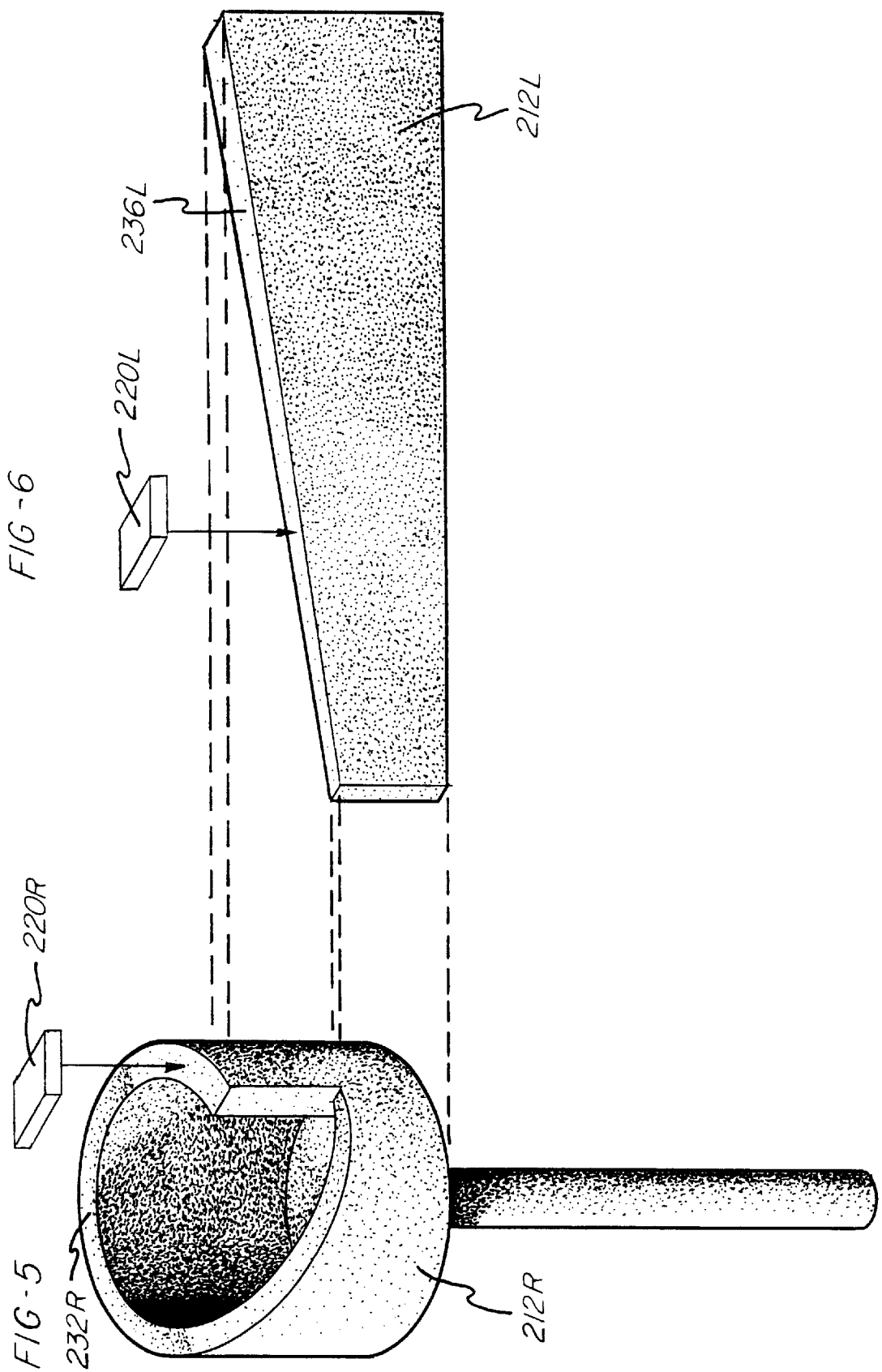

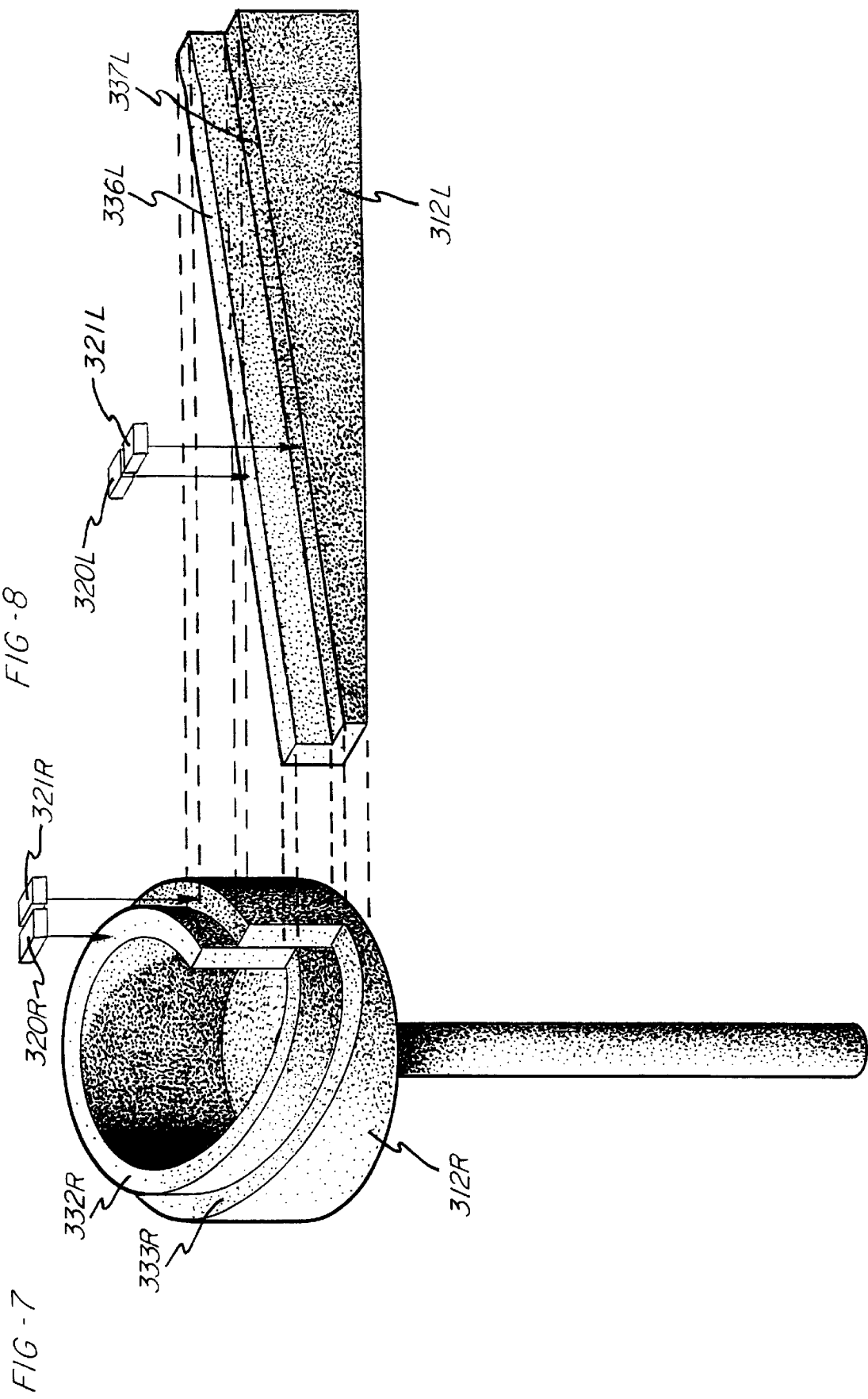

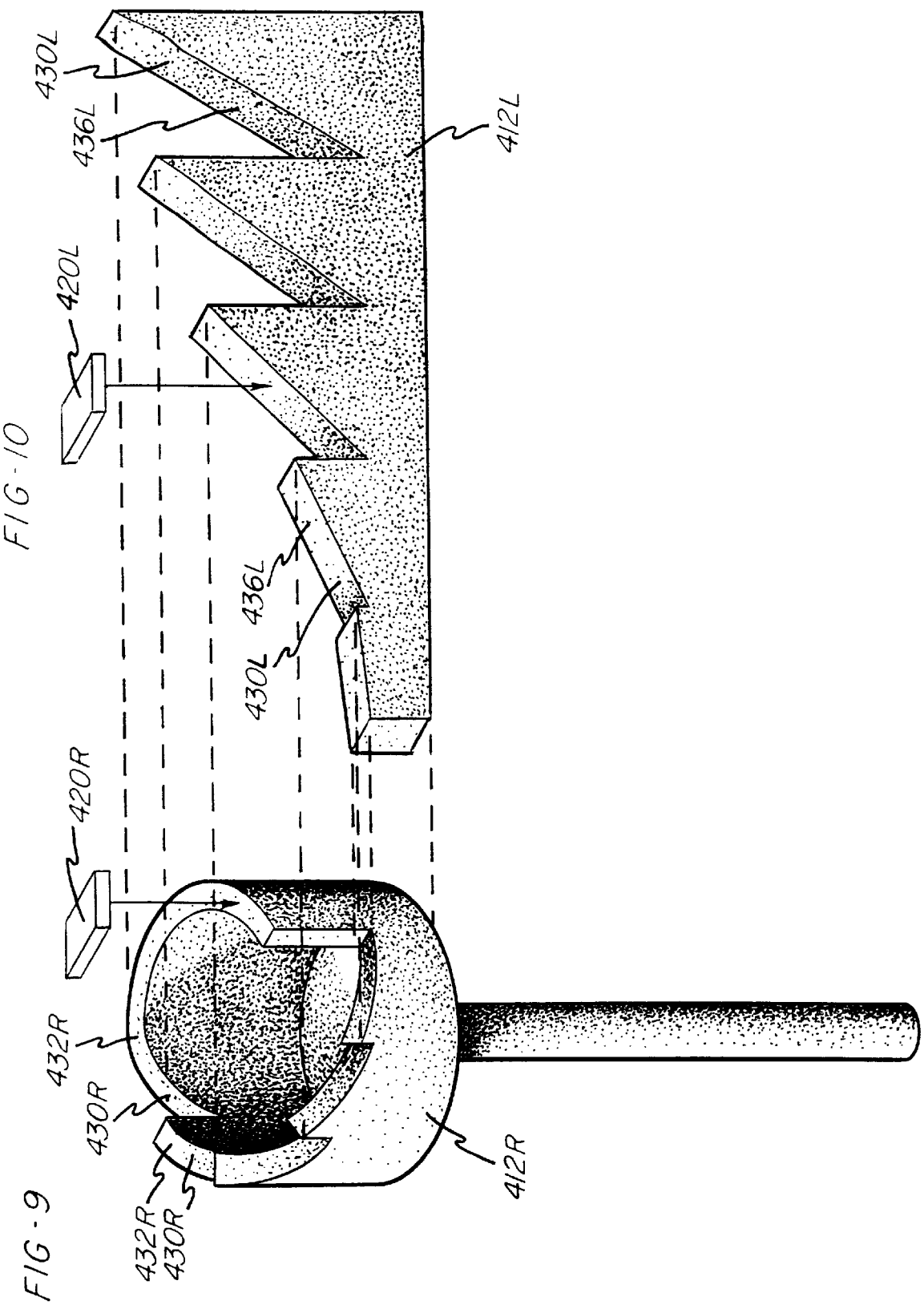

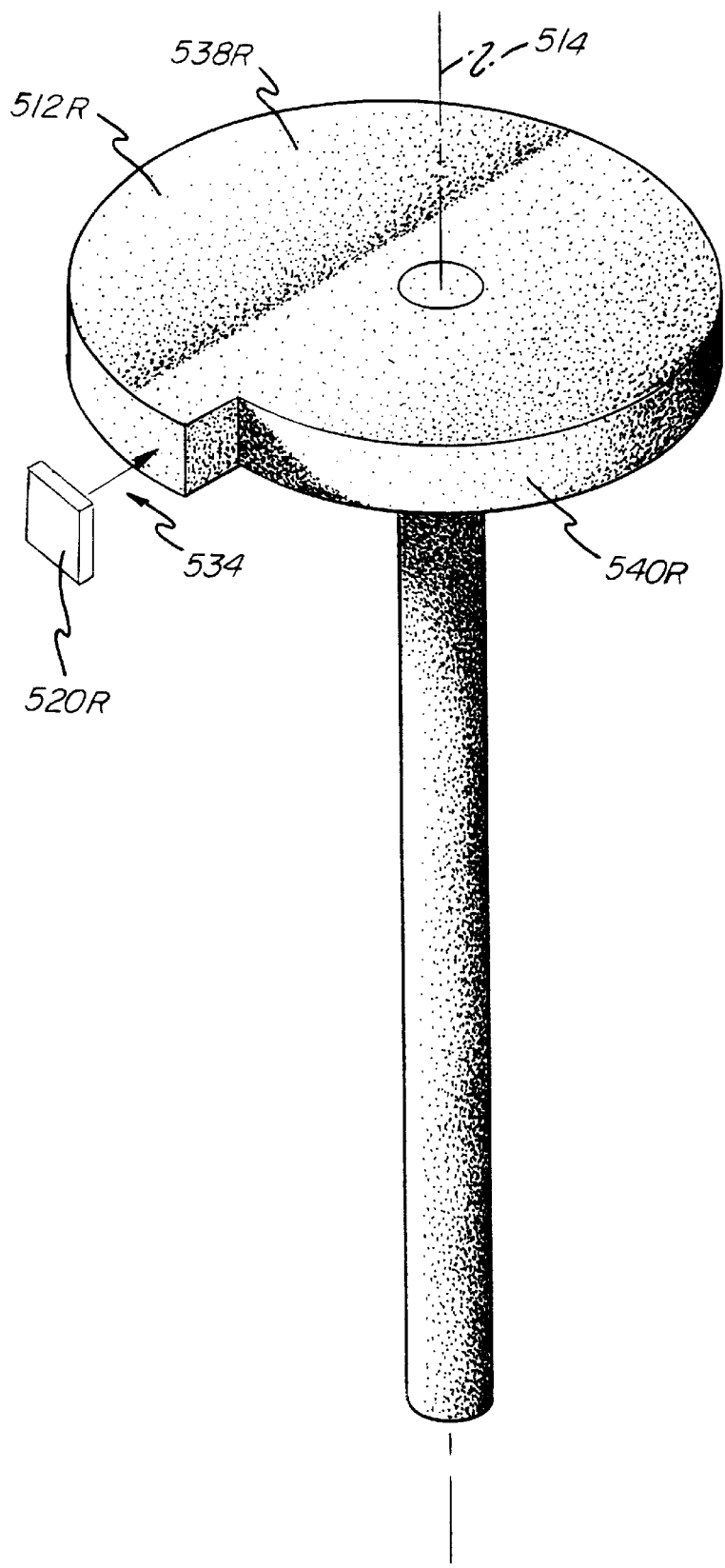

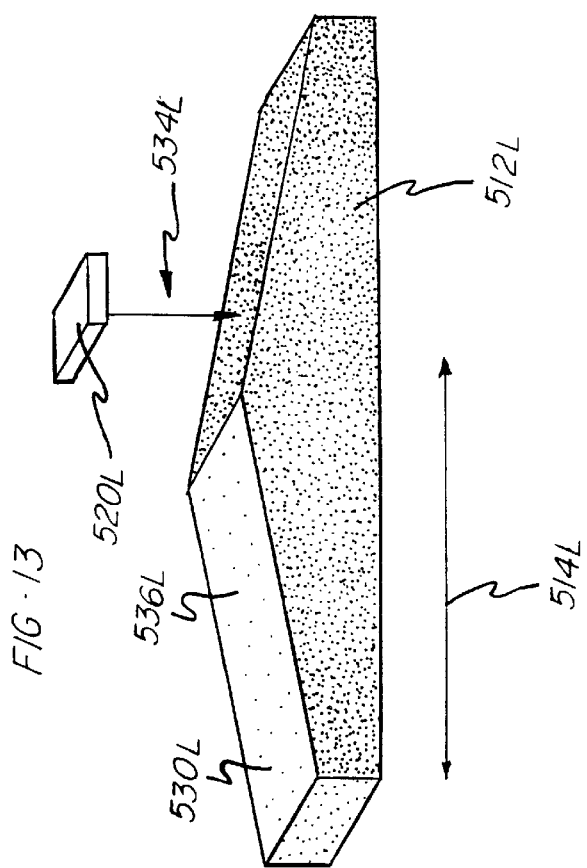
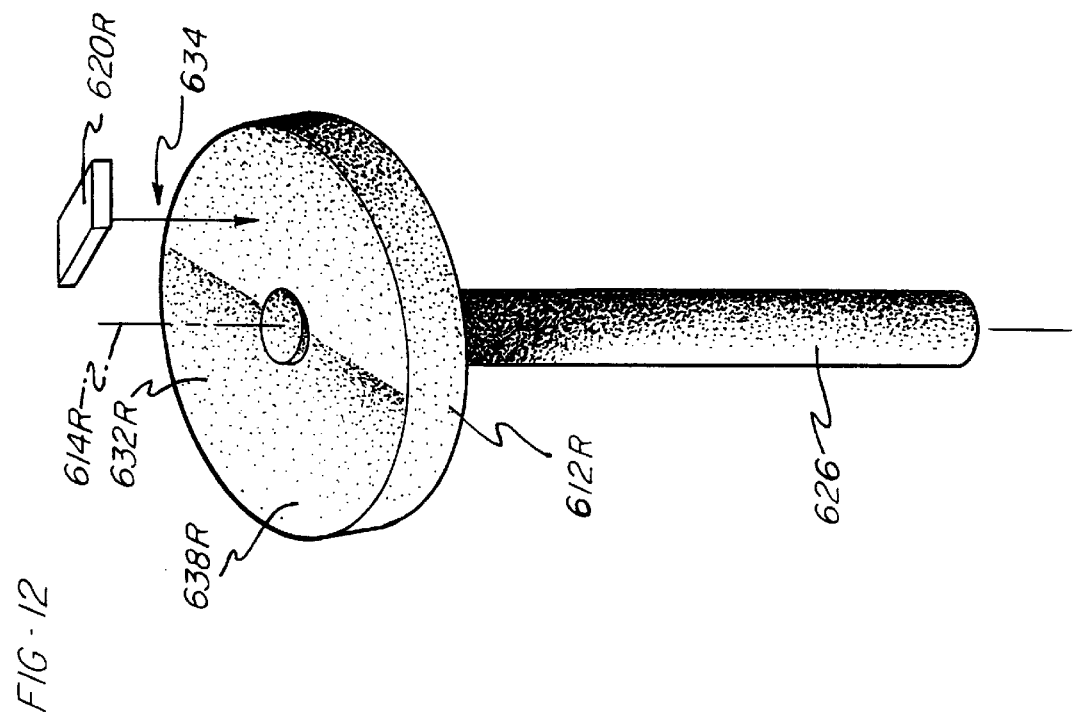

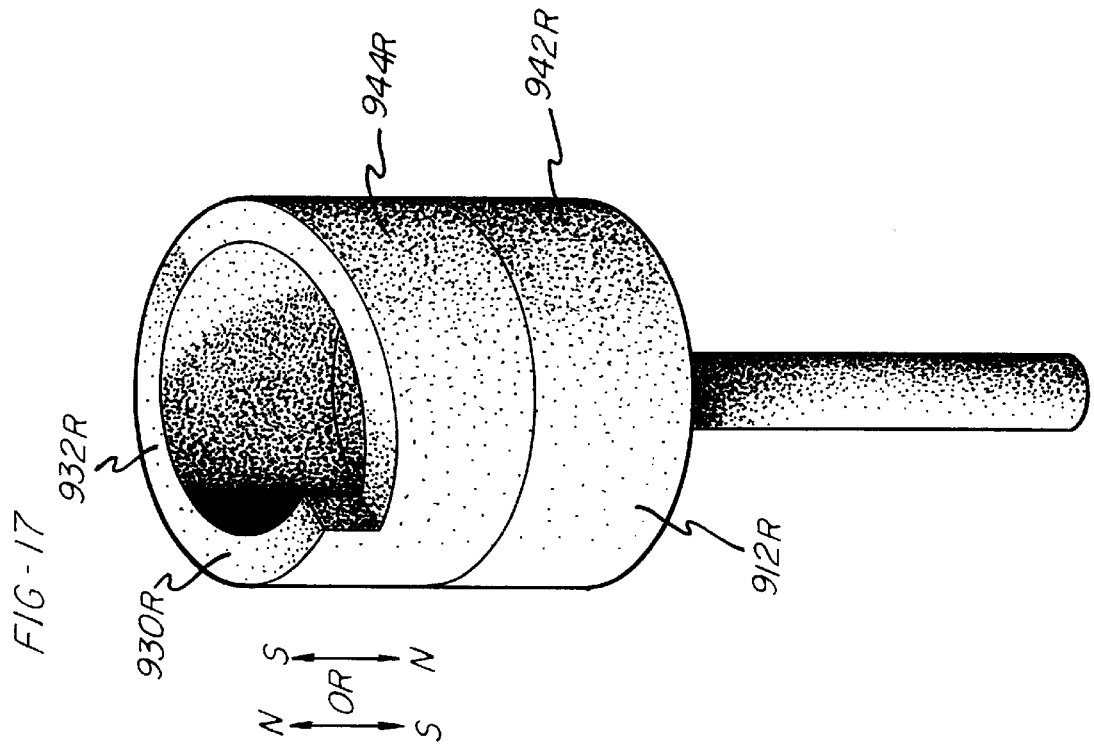
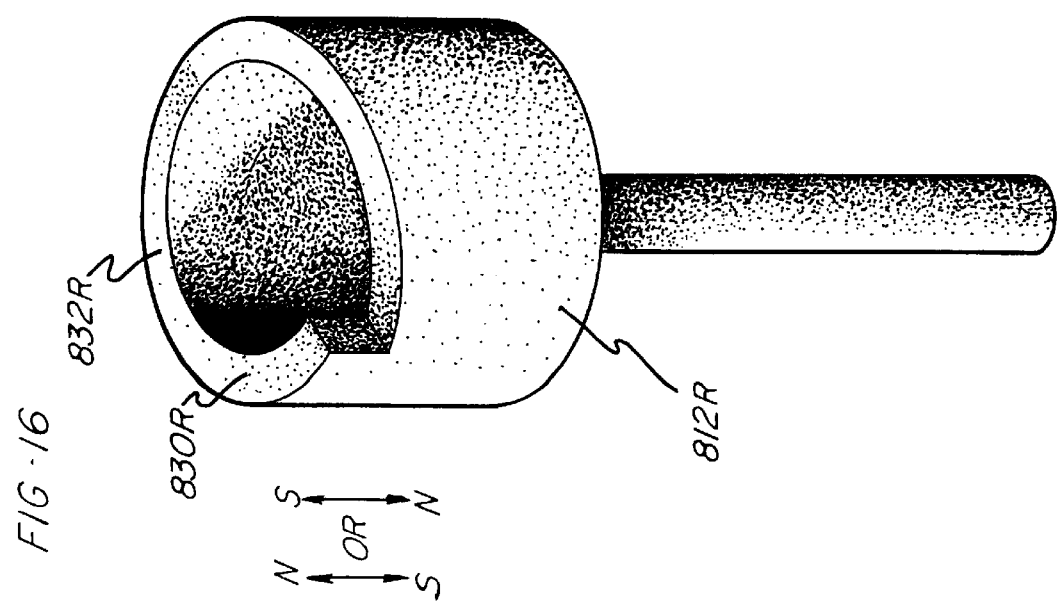

ABSOLUTE ENCODER

BACKGROUND OF THE INVENTION

This invention relates to an absolute-type encoder for generating position information by being mounted on a drive shaft of a rotationally driven element such as a servomotor or the like, or on a linearly driven element such as a linear actuator or the like.

Encoders serve as devices for detecting rotational and linear positions of machines such as servomotors, linear actuators, tachometers, and the like, to allow accurate positioning of such machines, and determination of such quantities as velocity and acceleration. Many different kinds of encoders are available for such purposes.

Incremental-type encoders are typically used for positioning servomechanisms due to their simplicity and low cost. However, incremental-type encoders require initializing whenever power is removed from the device. Initializing the encoder requires sensing a "home" position and then using the home position as a reference for subsequent position measurements. If the initializing process includes an error, then all subsequent measurements will include the error.

Absolute encoders also require initializing to a home or reference position upon being powered up for the first time. However, in contrast to incremental encoders, absolute encoders do not need to be re-initialized every time the power is turned on. Thus, after a one-time adjustment, an absolute encoder will provide position information immediately upon start up, without the need for re-initialization.

Typical absolute encoders are of the so-called discrete or digital type wherein position information is encoded on a rotary disk or a linear transducer element as binary ones and zeroes, or as on and off states. The binary information is typically encoded as a series of concentric rings or bands on a rotary disk, or as a series of adjacent bands or strips on a linear encoder. Typically, one ring or strip, corresponding to the most significant binary digit, is divided into two equal parts, with one part representing a one, and the other part representing a zero. Successive adjacent rings or strips are divided into twice as many equal alternating ones and zeroes as the previous rings or strips. The final ring or strip, having the greatest number of equal-sized ones and zeroes, corresponds to the least significant binary digit. Each distinct binary number can be associated with a unique rotational or linear position.

The ones and zeroes may be represented as alternately light and dark optically reflective domains, or as magnetic fields of alternating polarity, or as discrete variations in height or width wherein one height or width measurement corresponds to a one, and a second different height or width measurement corresponds to a zero.

Because of the two-valued nature of binary or digital encoders, intermediate values are not permitted as they give rise to ambiguous or indeterminate values, and hence, loss of precision in rendering position measurements. Thus, typical digital or binary encoders require sharp transitions between alternating regions, and relatively constant values within regions.

Digital or binary encoders are inherently limited in their fundamental accuracy by the number of rings or strips they possess, as well as by the size of the smallest regions in the least significant ring or strip. Within one of such regions, a rotary disk or linear actuator may be positioned anywhere, yet yield the same digital value, so that the potential measurement error is approximately equal to the size of the smallest binary region within the least significant ring or strip. Also, in order to achieve ever finer resolution, additional rings or strips must be added, thereby consuming more space, requiring additional sensors for each ring or strip, and adding to encoder complexity.

SUMMARY OF THE INVENTION

Accordingly, it is an object of the invention to provide an improved non-contact absolute encoder which is capable of reliable, accurate, and continuous position detection of a rotationally driven element or a linearly driven element.

Another object of the invention is to provide an improved non-contact absolute encoder which is simple in design and inexpensive to manufacture.

Yet another object of the invention is to provide an improved non-contact absolute encoder which provides high resolution position measurement information as a continuous function of workpiece position.

In accordance with a broad aspect of the invention, a non-contact absolute-type encoder for determining the position of a movable workpiece comprises: a movable transducer element adapted for coupling to said workpiece, said transducer element having a predetermined characteristic profile that varies in a substantially continuous way as a function of said transducer element position; a fixed sensor positioned proximate said transducer element to sense said characteristic profile to provide a substantially continuous output signal representative of the position of said transducer element; and means for positioning said sensor relative to said characteristic profile.

In a first embodiment of the invention, the workpiece includes a rotationally driven element; the transducer element is adapted to be coupled to the rotationally driven workpiece element with the transducer element further defining an axis of rotation; the characteristic profile of the transducer element varies substantially continuously as a function of the rotational position of the transducer element; and the sensor produces a substantially continuous output signal representative of the rotational position.

In a second embodiment of the invention, the workpiece includes a linearly driven element; the transducer element is adapted to be coupled to the linearly driven workpiece element with the transducer element further defining an axis of translation; the characteristic profile varies substantially continuously as a function of the linear position of the transducer element; and the sensor produces a substantially continuous output signal representative of the linear position.

The characteristic profile may be magnetic field strength, optical reflectivity, magnetic reluctance, or some other characteristic that is measurable by non-contact means and may be representative of transducer element position.

The invention will be further described and illustrated in the following description, accompanying drawings, and claims.

BRIEF DESCRIPTION OF THE DRAWINGS

FIG. 1 is an exploded perspective view of a first embodiment of a rotary absolute encoder in accordance with the invention;

FIG. 2 is a graph of sensor output signal voltage as a function of air gap distance for the rotary absolute encoder of FIG. 1;

FIG. 3 is a perspective view of a first embodiment of a rotary transducer element and associated sensor in accordance with the invention;

FIG. 4 is a perspective view of a first embodiment of a linear transducer element and associated sensor in accordance with the invention;

FIG. 5 is a perspective view of a second embodiment of a rotary transducer element and associated sensor;

FIG. 6 is a perspective view of a second embodiment of a linear transducer element and associated sensor;

FIG. 7 is a perspective view of a third embodiment of a rotary transducer element and associated sensor;

FIG. 8 is a perspective view of a third embodiment of a linear transducer element and associated sensor;

FIG. 9 is a perspective view of a fourth embodiment of a rotary transducer element;

FIG. 10 is a perspective view of a fourth embodiment of a linear transducer element and associated sensor;

FIG. 11 is a perspective view of a fifth embodiment of a rotary transducer element and associated sensor;

FIG. 12 is a perspective view of a sixth embodiment of a rotary transducer element and associated sensor;

FIG. 13 is a perspective view of a fifth embodiment of a linear transducer element and associated sensor;

FIG. 16 is a perspective view of a rotary magnetic transducer element having a single continuously varying magnetic characteristic profile in accordance with the first rotary embodiment;

FIG. 17 is a perspective view of a rotary magnetic transducer element similar to the transducer element of FIG. 16 but having a composite magnetic/ferrous material construction;

DETAILED DESCRIPTION OF THE PREFERRED EMBODIMENTS

Figure 15:
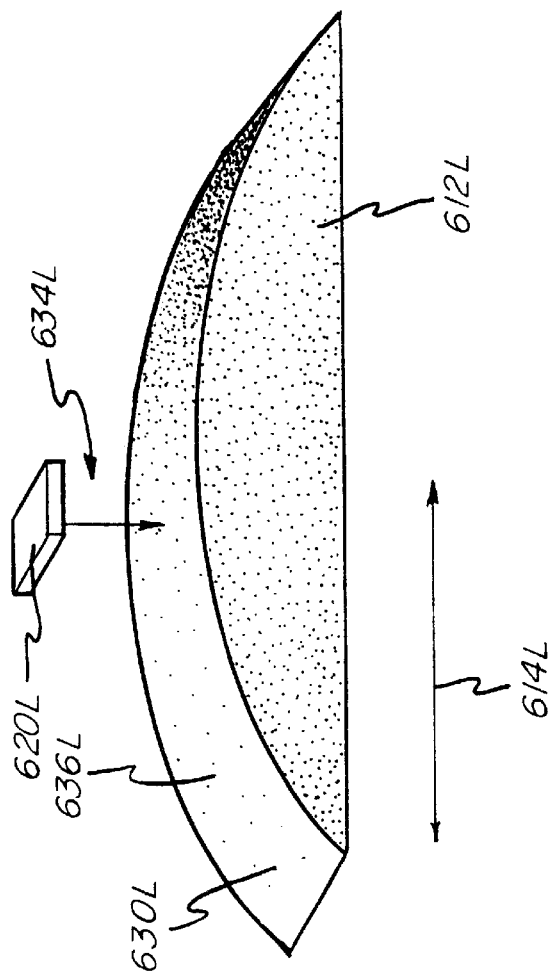
FIG. 15 is a perspective view of a sixth embodiment of a linear transducer element and associated sensor.

Turning first to FIG. 1, there is shown a non-contact absolute encoder 10 including a rotatable magnetic transducer element 12 mounted for rotation about an axis of rotation 14 within a housing 16. A circuit board 18 is mounted within the housing 16 so that a Hall effect magnetic sensor 20 mounted on the circuit board 18 is positioned proximate an axial end 22 of the transducer element 12. An end cap 24 mounts to an end of the housing 16 to enclose the encoder 10. A drive shaft 26 couples the transducer element 12 to a rotationally driven workpiece (not shown).

The transducer element 12 includes an annular cylindrical magnetic portion 30 having a longitudinal axis parallel to the axis of rotation 14, and a substantially axially oriented surface 32 that varies substantially continuously in an axial direction, that is, in a direction parallel to the axis of rotation 14. The magnetic portion 30 is formed of magnetic or magnetized material having an axially oriented magnetic field as indicated by the double-headed arrow labeled N for North and S for South in FIG. 1. Of course, the magnetic polarity may be the reverse of that shown. As a result of the magnetic field and the continuously axially varying surface 32, the transducer possesses a characteristic magnetic field strength profile that vanes in a predetermined, substantially continuous way as a function of the transducer element angular position. The axially oriented surface 32 and sensor 20 define an air gap 34 therebetween. The characteristic magnetic profile for the transducer element 12 varies substantially continuously in magnitude from a minimum value at a first angular reference position where the air gap 34 is a maximum, through substantially 360° about the axis of rotation 14 to a maximum value at a second angular reference position where the air gap 34 is a minimum.

As shown in FIG. 2, which is a plot of the output signal voltage measured in Volts from the magnetic sensor 20 as a function of the air gap distance 34 measured in inches, the output voltage signal vies continuously from a maximum value where the air gap 34 is a minimum, to a minimum value where the air gap 34 is a maximum value. As a result, the angular position of the transducer element 12 may be associated with a unique output signal value. The output signal value therefore represents the angular position of the transducer element 12. The accuracy and repeatability of the encoder is determined by, among other things, the sensitivity of the magnetic sensor, that is, the smallest amount of detectable output signal change produced by a corresponding change in transducer element angular position.

Turning now to FIGS. 3 and 4, there are shown first embodiments of a rotary transducer element 112R and a linear transducer element 112L, and associated sensors 120R and 120L. The transducer element 112L is similar in physical structure to the transducer element 12 of FIG. 1. Transducer element 112L may comprise magnetic material and possess an axially oriented magnetic characteristic profile that varies in the axial direction in a predetermined substantially continuous manner as a function of transducer element angular position. However, in an alternative embodiment, sensor 120R comprises an optical sensor, and the transducer element 112R comprises an optical portion 130R which has an axially oriented surface 132R having an optical reflectivity characteristic profile detectable by the sensor 120R. The surface 132R may be plated, polished, or otherwise treated so as to achieve the desired characteristic profile.

Light reflected from the surface 132R toward the sensor 120R is detected by the sensor 120R which results in an output signal representing the intensity of the detected light. It will be appreciated that the reflected light intensity varies substantially continuously from a minimum value at a first angular reference position where the gap between the surface 132R and the sensor 120R is greatest, through substantially 360° to a second angular reference position where the gap between the surface 132R and the sensor 120R is least.

As suggested by the dashed lines extending between FIGS. 3 and 4, the linear transducer element 112L may be thought of as the rotary transducer element 112R cut axially between the first and second angular reference positions, then straightened but or laid flat to yield the inclined plane of the linear transducer element 112L. Conversely, the rotary transducer element 112R may be thought of as an inclined plane rolled into an annular cylindrical shape with the leading edge joined to the trailing edge.

The linear transducer element 112L is coupled to a linearly driven workpiece (not shown) by any suitable means such as, without limitation, adhesives, welding, screws, or magnetic attraction. The linear transducer element 112L has a longitudinal axis that is parallel to an axis of translation 114L, and a transversely oriented surface 136L. The transducer element 112L comprises a portion 130L that may be either a magnetic portion or an optical portion, in a fashion similar to the rotary transducer element 112R.

The sensor 120L is positioned proximate the transversely oriented surface 136L. In the case where the transducer element 112L comprises a magnetic portion having a transversely oriented magnetic field characteristic profile, the sensor 120L is a magnetic sensor positioned so as to detect the magnetic field characteristic profile. The transversely oriented surface 136L and sensor 120L define an air gap 134L that varies substantially continuously in the transverse direction as a function of the transducer element 112L linear position in a direction parallel to the axis of translation. Thus, it will be seen that as the transducer element 112L is translated back and forth along its axis of translation 114L, the sensor 120L detects the substantially continuously varying characteristic profile and produces a substantially continuously varying output signal representative of the transducer element linear position.

In the case where the transducer element 112L comprises an optical portion 130L having a transversely oriented optical reflectivity characteristic profile, the sensor 120L is an optical sensor positioned so as to detect light reflected from the transversely oriented surface 136L. The optical reflectivity characteristic profile varies substantially continuously in the transverse direction as a function of the linear position of the transducer element 112L in a direction parallel to the axis of translation 114L.

One type of optical sensor suitable for the invention that may be mentioned is a photodiode, although it will be appreciated by those persons with ordinary skill in the art that other kinds of optical sensors may be employed. Although the encoder may use ambient light, it is preferred to use a light source having a predetermined illumination level positioned so as to direct light toward the transversely oriented surface 136L to be reflected toward the optical sensor 120L. In an especially preferred embodiment, the sensor 120L may further comprise the light source. One type of light source that may be mentioned, without limitation, is a laser light source, such as a diode laser.

Turning now to FIGS. 5 and 6, there is shown second embodiments of a rotary transducer element 212R and linear transducer element 212L, respectively, and associated sensors 220R, 220L. The structure and function of the transducer elements 212R, 212L are substantially identical to those of the transducer elements 112R, 112L, and will not be repeated. Transducer elements 212R, 212L differ in that the axially oriented surface 232R and transversely oriented surface 236L vary continuously and uniformly from a maximum width at a first reference position where the air gap is a minimum, to a minimum width at a second reference position where the air gap is a maximum. Of course, the width of the surfaces 232R, 236L, or alternatively, the thicknesses of the transducer elements 212R, 212L, may vary in the opposite fashion, that is, from narrowest to widest. Alternatively, the widths or thicknesses may be varied as desired so as to produce the desired substantially continuously varying characteristic profile.

Turning now to FIGS. 7 and 8, there are shown third embodiments of a rotary transducer element 312R and a linear transducer element 312L, respectively, and associated sensors 320R, 320L. The structure and operation of the transducer elements 312R, 312L are substantially identical to those of transducer elements 112R, 112L and will not be repeated.

However, transducer elements 312R, 312L have additional substantially continuously varying axially oriented surface 333R and transversely oriented surface 337L, respectively, adjacent to surfaces 332R, 336L. Although the surfaces 333R, 337L are shown as having different characteristic profiles from surfaces 332R, 336L, they could be the same, or they may be of different types, that is, one surface may have a magnetic characteristic profile while the other has an optical characteristic profile. Of course, the surfaces 333R, 337L have the appropriate type of sensor 321R, 321L, respectively, associated with them, which may be mounted positionally adjacent sensors 320R, 320L, as shown, or positionally offset, as desired.

Turning now to FIGS. 9 and 10, there are shown fourth embodiments of a rotary transducer element 412R and linear transducer element 412L, respectively, and associated sensors 420R, 420L. The structure and operation of the transducer elements are substantially identical to those of transducer elements 112R, 112L, and will not be repeated.

However, transducer elements 412R, 412L have multiple portions 430R, 430L with corresponding axially oriented surfaces 432R or transversely oriented surfaces 436L arranged sequentially. Each portion has its own distinct characteristic profile. However, since adjacent portions have characteristic profiles with some values in common, it is necessary to further identify which portion is generating a particular characteristic profile value so as to be able to associate that value with a unique transducer element position. In the present embodiments, this is accomplished by providing each portion with a corresponding surface having a unique slope. In order to detect the slope of a given surface, closely spaced dual sensors may be used. Alternatively, a single sensor may be used in conjunction with associated circuitry (not shown) that compares the present characteristic profile value with a previous characteristic profile value measurement to determine the slope of the surface currently adjacent the sensor and hence, the current position of the transducer element.

Turning now to FIG. 11, there is shown a fifth embodiment of a rotary transducer element 512R and associated sensor 520R. The structure and operation of the transducer element 512R are similar to those for transducer element 112R. However, instead of an annular cylindrical portion having an axially oriented surface, transducer element 512R further comprises a disk-shaped portion 538R having a longitudinal axis parallel to its axis of rotation 514, and a radially oriented surface 540R that varies continuously in a radial direction as a function of angular position of the transducer element 512R. The sensor 520R is mounted radially proximate the surface 540R to define a substantially continuously variable air gap 534 therebetween.

In the case where the transducer element 512R comprises a magnetic portion, it has a radially directed magnetic field having a predetermined, substantially continuous, radially oriented, magnetic field intensity characteristic profile. In the case where the transducer element 512R comprises an optical portion, it has a predetermined, substantially continuous, radially oriented, optical reflectivity characteristic profile.

In either case, it will be seen that the characteristic profile varies substantially continuously from a minimum at a first angular reference position, where the air gap 534 is at a maximum, through substantially 360° to a maximum value at a second angular reference position, where the air gap 534 is at a minimum.

Turning now to FIG. 12, there is shown a sixth embodiment of a rotary transducer element 612R and associated sensor 620R. The transducer element 612R includes a disk-shaped portion 638R attached to a rotary shaft 626 at an angle with respect to an axis of rotation 614, and a substantially axially oriented surface 632R. The portion 638R and surface 632R define a characteristic profile that varies substantially continuously as a function of the angular position of the transducer element 612R about its axis of rotation 614R. The sensor 620R is positioned axially proximate the surface 632R and defines, in combination with the surface 632R, an air gap 634 therebetween that varies substantially continuously as a function of the angular position of the transducer element. It will be seen that the characteristic profile increases substantially continuously and uniformly from a minimum value at a first angular reference position, where the air gap 634 is a maximum, to a maximum value at a second angular reference position, where the air gap 634 is a minimum, and then decreases from the maximum value at the second angular reference position to the minimum value at the first angular reference position, through 360° total angular displacement.

Turning now to FIG. 13, there is shown a fifth embodiment of a linear transduce element 512L and associated sensor 520L. The transducer element 512L includes a generally peaked portion 530L having a transversely oriented surface 536L having two portions sloping downwardly from a peak therebetween. The portion 530L and surface 536L define a substantially continuously varying characteristic profile as a function of the linear position of the transducer element 512L along its axis of translation 514L. The sensor 520L is positioned transversely proximate the transversely oriented surface 536L and defines, in combination with the surface 536L, an air gap 534L that varies substantially continuously as a function of the linear position of the transducer element.

It will be seen that the characteristic profile increases substantially continuously and uniformly from a local minimum value at a first linear reference position, at one end of the portion 530L where the air gap 534L is a local maximum, to a maximum value at a second linear reference position, at an intermediate point of the portion 530L where the air gap 534L is a minimum, and then decreases to a local minimum value at a third linear reference position, at the other end of the portion 530L where the air gap 534L is a local maximum.

Because the two portions of the surface 536L give rise to a characteristic profile having the same value at more than one position along the transducer element 512L in a direction parallel to the axis of translation, it is desirable to employ means for ascertaining which portion of the surface 536L is being detected by sensor 520L. Such means have been described above in connection with the third embodiments, illustrated in FIGS. 7 and 8. Of course, the surface 536L may have other profiles, as desired, such as, for example, a generally V-shaped profile that decreases from a local maximum to a minimum, and then increases to another local maximum.

Figure 14:
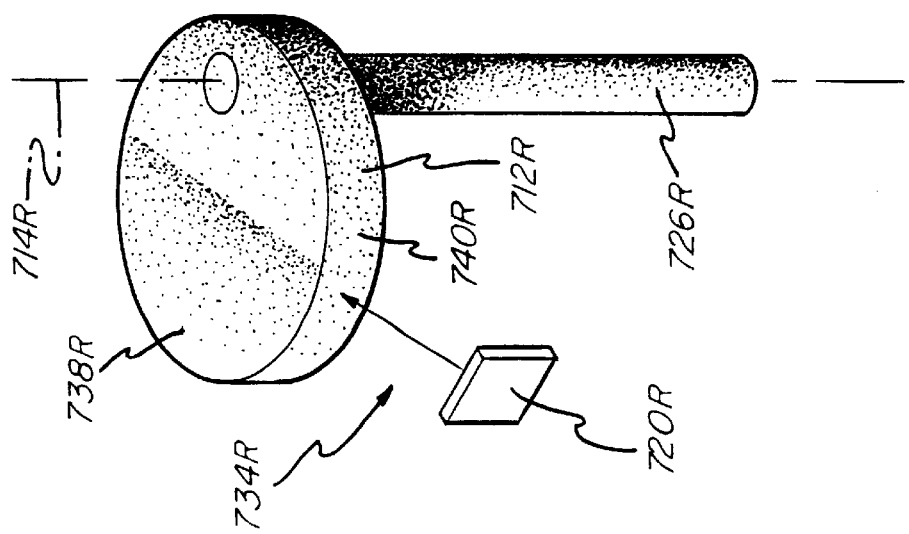
FIG. 14 is a perspective view of a seventh embodiment of a rotary transducer element and associated sensor.

Turning now to FIG. 14, there is shown a seventh embodiment of a transducer element 712R and its associated sensor 720R. The transducer element 712R includes a disk-shaped portion 738R attached to a rotary shaft 726R for rotation about an axis of rotation 714R. The portion 738R includes a radially oriented surface 740R that, in combination with the radially proximate sensor 720R, defines an air gap 734R, and has a substantially continuously varying characteristic profile as a function of the angular position of the transducer element about its axis of rotation 714R.

Turning now to FIG. 15, there is shown sixth embodiment of a linear transducer element 612L and its associated sensor 620L. The transducer element 612L includes an elongated arcuately shaped portion 630L for coupling to a linearly driven portion of a workpiece (not shown) for translation along an axis 614L. The portion 630L includes a surface 636L substantially oriented transversely to the axis of translation 614L that, in combination with the transversely proximate sensor 620L, defines a substantially continuously varying air gap 634L therebetween. The portion 630L has a transversely oriented characteristic profile that varies substantially continuously as a function of linear position of the transducer element in a direction parallel to the axis of translation. The sensor 620L will typically be coupled to a portion of the workpiece (not shown) that is stationary with respect to the linearly driven portion.

Turning now to FIGS. 16 and 17, there are shown rotary magnetic characteristic profile transducer elements 812R and 912R, constructed in accordance with the invention. Each transducer element 812R, 912R includes a magnetic portion 830R, 930R having an axially oriented surface 832R, 932R, and an axially oriented magnetic field that varies substantially continuously as a function of transducer element angular position.

Magnetic portion 830R comprises an annular cylindrical portion of magnetic or magnetized material. In contrast, magnetic portion 930R comprises a lower portion 942R comprising magnetic or magnetized material having an axially oriented magnetic field, and an upper portion 944R comprising ferrous or magnetically conductive material and having an annular cylindrical shape.

Figure 19:
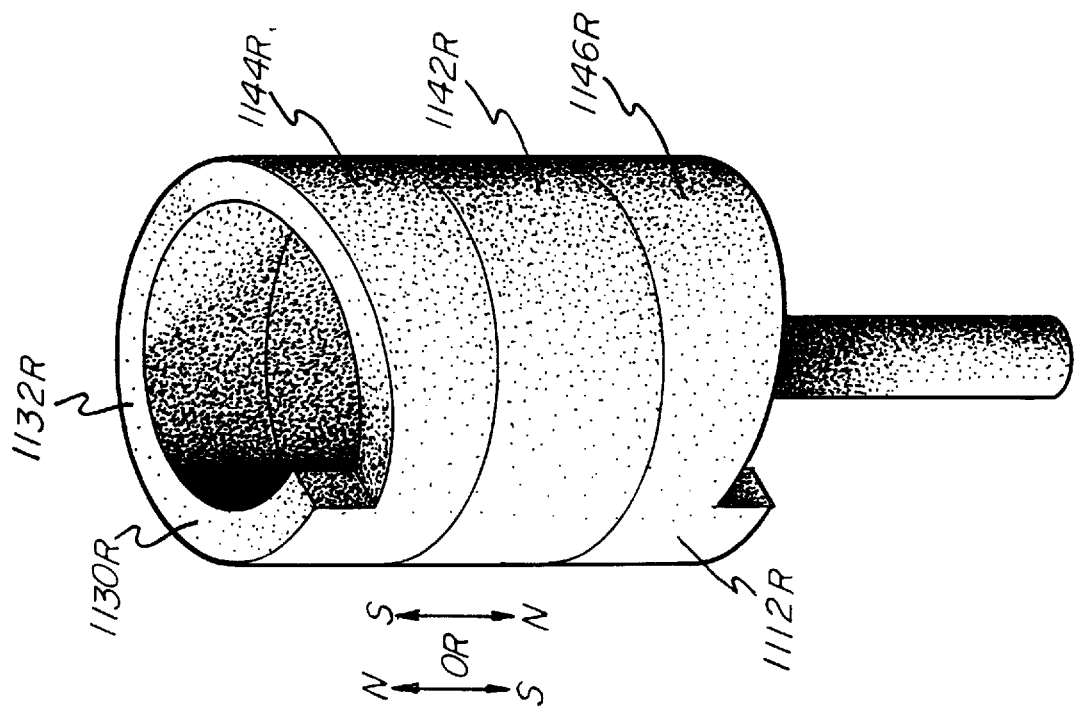
FIG. 19 is a perspective view of a rotary magnetic transducer element similar to the transducer element of FIG. 18 but having a composite magnetic/ferrous material construction.
Figure 18:
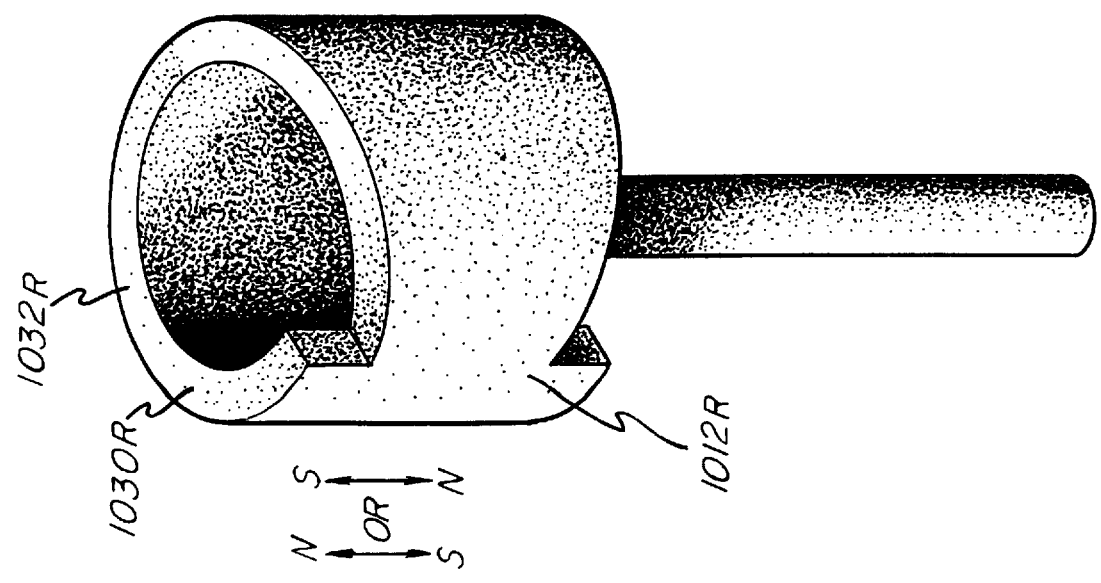
FIG. 18 is a perspective view of a rotary magnetic transducer element having two longitudinally axially opposing continuously varying magnetic characteristic profiles.

Turning now to FIGS. 18 and 19, there are shown rotary magnetic characteristic profile transducer elements 1012R and 1112R, constructed in accordance with the invention, that are substantially similar to the embodiments 812R and 912R, respectively, shown in FIGS. 16 and 17. The transducer elements 1012R, 1112R each include a magnetic portion 1030R, 1130R having an axially oriented surface 1032R, 1132R and an axially oriented magnetic field that varies substantially continuously as a function of transducer element angular position.

However, each transducer element 1012R, 1112R includes a second axially oriented surface that faces in the opposite axial direction from the first axially oriented surfaces 1032R, 1132R. The second axially oriented surfaces may be longitudinally and circumferentially aligned, and have second characteristic magnetic profiles substantially similar to the first characteristic magnetic profiles. Alternatively, the second axially oriented surfaces may be circumferentially or angularly offset from the first axially oriented surfaces 1032R, 1132R. In yet another embodiment, the second axially oriented surfaces may have differing characteristic magnetic profiles, such as, for example, they may be formed so as to spiral in a direction circumferentially opposite that of the first characteristic magnetic profiles. That is, as the first characteristic magnetic profiles increase substantially continuously as a function of angular position, the second characteristic magnetic profiles decrease substantially continuously as a function of angular position, and vice versa. Of course, the second axially oriented surfaces may have other profiles, as desired, such as, without limitation, any of the profiles disclosed elsewhere in this description.

The transducer element 1112R of FIG. 19 differs from the transducer element 1012R of FIG. 18 in that magnetic portion 1130R comprises a middle portion 1142R of magnetic or magnetized material, and axially opposing annular cylindrical upper and lower portions 1144R and 1146R, respectively, comprising ferrous material. Of course, for the embodiments shown in FIGS. 18 and 19, second sensors (not shown) positioned axially proximate the second axially oriented surfaces detect the second characteristic profiles.

It should be noted that while the embodiments 1012R and 1112R have been described as magnetic rotary transducer elements, they may also be rotary transducer elements having characteristic optical profiles, or a combination of magnetic and optical characteristic profiles.

Figure 20:
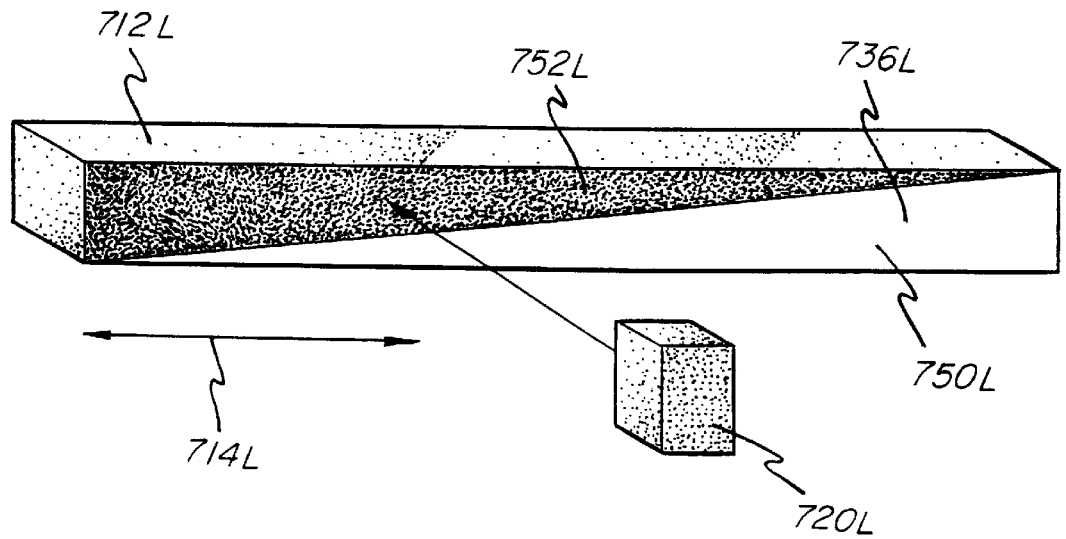
FIG. 20 is a perspective view of a seventh embodiment of a linear transducer element and associated sensor.
Figure 21:
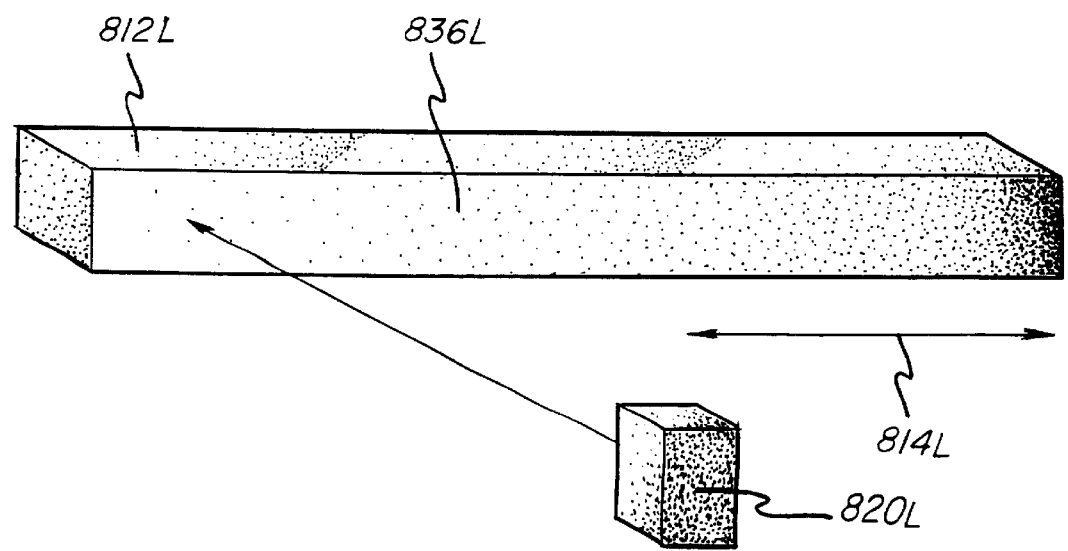
FIG. 21 is a perspective view of an eighth embodiment of a linear transducer element and associated sensor.

Turning now to FIGS. 20 and 21, there are shown seventh and eighth embodiments of linear transducer elements 712L and 812L, respectively, and associated sensors 720L and 820L. Although the illustrated embodiments will be described in connection with characteristic optical profiles, the characteristic profiles may also comprise magnetic characteristic profiles.

The transducer element 712L has an axis of translation 714L and a transversely oriented surface 736L having first and second optical portions 750L and 752L, respectively. The first optical portion 750L is white, or substantially reflective, and increases substantially continuously from a minimum width at the left end of the transducer element as shown in FIG. 20, to a maximum width at the right end of the transducer element. The second optical portion 752L comprises an area of lesser optical reflectively, and may be black, that varies in a manner converse to that of the first optical portion 750L. That is, it decreases substantially continuously from a maximum width at the left end of the transducer element 712L, to a minimum width at the right end of the transducer element 712L. Thus, it will be seen that an optical sensor 720L that reads or senses a strip or area of surface 736L that spans the width of the transducer element 712L produces a substantially continuous output signal representative of the linear position of the transducer element in a direction parallel to the axis of translation.

The eighth linear transducer element 812L is similar to the seventh linear transducer element embodiment 712L, except that the surface 836L is provided with a substantially continuously varying optical reflectivity gradient from the left end of the transducer element 812L, in the direction of the axis of translation 814L, to the right end of the transducer element 812L. As shown, the characteristic optical profile decreases substantially continuously from a maximum value corresponding to maximum reflectivity at the left end, to a minimum value corresponding to minimum reflectivity at the right end. Of course, the optical characteristic profiles just described with respect to linear transducer elements may also be employed in connection with rotary transducer elements.

While many different embodiments of the invention have been described above, it should be noted that the invention more generally is directed to the sensing of a position of a workpiece having a characteristic profile having a well-defined mathematical correlation with the position. One aspect of the mathematical relationship between workpiece position and the characteristic profile is that the profile varies in a substantially continuous manner. That is, as the position of the workpiece changes, the profile likewise changes in a predetermined relationship. Moreover, while discontinuous or sudden transitions in profile values from one value to the next are within the scope of the invention, they are greatly reduced in number as compared to digital encoders wherein regions of constant or non-changing values are separated from each other by sharp and well-defined transitions. Thus, it will be seen that the invention is not limited to the specific shapes or profiles shown herein, but includes any shape or profile that can be detected by a sensor that allows one to mathematically identify the position of a workpiece.

As examples of further applications of the present invention, the basic concepts of the present invention may be incorporated into a potentiometer having a full 360° of rotation wherein the strength of the sensed signal may be referenced as the potentiometer value. A further application of the present invention may be as an instantaneous accelerometer wherein changes in the sensor output, with reference to measured time intervals, provide an acceleration value related to the rotation or linear movement of the transducer element. An additional application relates to the use of the present invention as a linear or rotary velocity displacement transducer providing direct current analog signals, as contrasted with existing devices which operate with alternating current excitation voltage.

Figure 22:
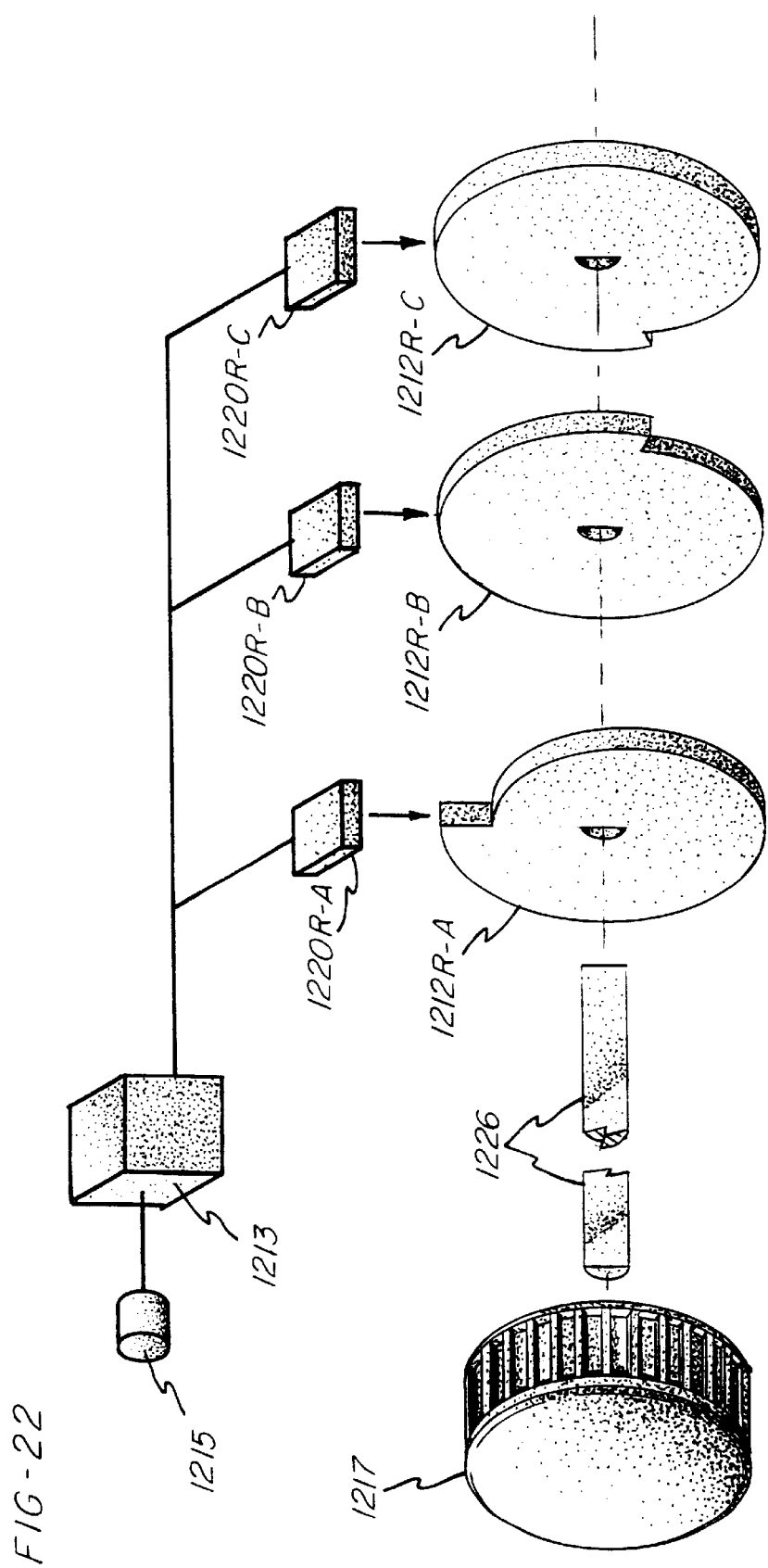
FIG. 22 is a perspective partially exploded view of a further embodiment of the invention showing a configuration for an electronic lock.

Finally, the present invention may be configured to operate an electronic lock which may be constructed in accordance with various configurations, one of which is illustrated in FIG. 22. In the illustrated embodiment of the electronic lock, a plurality of spiral rotary transducer elements 1212R-A, 1212R-B, 1212R-C are illustrated mounted in side-by-side relation on a shaft 1226 which is adapted to be rotated by a knob 1217. Sensors 1220R-A, 1220R-B and 1220R-C are positioned to sense the particular orientation of each of the corresponding rotary transducer elements 1212R-A, 1212R-B and 1212R-C. Each of the rotary transducer elements 1212R-A, 1212R-B and 1212R-C are located at rotationally or angularly offset positions relative to each other to produce an individual sensor signal corresponding to the particular rotational position of the knob 1217 whereby a set of analog signals are produced by the sensors 1220R-A, 1220R-B and 1220R-C which are fed to a controller 1213 and matched against a predetermined set of signal values. A button 1215 may additionally be provided to be actuated to indicate that the data from the sensors 1220R-A, 1220R-B and 1220R-C should be read by the controller 1213. If the signals match the predetermined values within a desired level of tolerance, the controller will allow the process to continue where a second set point is required.

This form of electronic lock provides an infinite number of variables which must be overcome to meet the access requirements set by the lock. These variables includes providing an unknown number of spiral or sensor combinations, incorporating any number of required set positions, and providing an additional variable in the form of the slope of each spiral provided on the transducer elements which determine or result in a specific analog output from the associated sensor, the slopes of which may be provided in an infinite number of variations. Further, to enhance security, the lock system may be designed such that the outputs of the sensors 1220R-A, 1220R-B and 1220R-C are required to match a predetermined analog curve prior to reaching the predetermined set points.

Further, the electronic lock embodiment may also incorporate a lockout feature wherein incorrect sensor inputs would cause the controller 1213 to not accept additional inputs for a specified time period, and any further attempts to enter data may result in further lockout conditions. Alternatively, an incorrect input may trigger the controller 1213 to require the knob 1217 to be rotated to a predetermined reset position, other than the positions required for normal activation of the lock, before proceeding to enter further data, or the entire combination sequence could be automatically changed to a secondary set of requirements in response to the controller 1213 receiving input data which does match the predetermined data inputs. Of course, the descriptions of the electronic lock provided herein are by way of example only, and there may be additional modes of operation for the electronic lock not herein described. It should be apparent that the main advantage provided by the present electronic lock lies in the fact that no contact is provided between the sensors and the rotary transducer elements, i.e., no tumblers, such that it would be impossible to "feel" a set point corresponding to the set point for the lock.

While the forms of apparatus herein described constitute preferred embodiments of this invention, it is to be understood that the invention is not limited to these precise forms of apparatus, and that changes may be made therein without departing from the scope of the invention, which is defined in the appended claims.

What is claimed is:

1. An absolute encoder for determining the position of a movable workpiece including a rotationally driven element, said absolute encoder comprising:

a movable transducer element adapted for coupling to said rotationally driven element, said transducer element having a characteristic profile that varies substantially continuously as a function of the angular position of said transducer element;

a fixed sensor positioned to sense said characteristic profile to produce a substantially continuous output signal representative of the angular position of said transducer element; and wherein said characteristic profile varies substantially continuously from a minimum value at a first angular reference position through substantially 360° to a maximum value at a second angular reference position.

2. The absolute encoder of claim 1 wherein:
   said characteristic profile varies in a direction parallel to said axis of rotation.

3. The absolute encoder of claim 1 wherein:
   said characteristic profile varies in a direction radial to said axis of rotation.

4. The absolute encoder of claim 1 wherein:
   said characteristic profile is an optical reflectivity profile and said sensor is an optical sensor.

5. The absolute encoder of claim 1:
   including a plurality of transducer elements, each having a characteristic profile, said characteristic profiles being angularly offset from each other;
   a plurality of sensors including a sensor associated with each of said transducer elements to produce output signals representative of the position of the respective transducer elements; and
   a controller for receiving the output signals from the sensors and for comparing the output signals to predetermined values.

6. An absolute encoder for determining the position of a movable workpiece including a rotationally driven element, said absolute encoder comprising:

a movable transducer element adapted for coupling to said rotationally driven element, said transducer element having characteristic profile comprising a magnetic field strength profile that varies substantially continuously as a function of the angular position of said transducer element;

a fixed sensor positioned to sense said characteristic profile to produce a substantially continuous output signal representative of the angular position of said transducer element;

said transducer element further defining an axis of rotation and comprising an annular cylindrical magnetic portion having a longitudinal axis parallel to said axis of rotation, said magnetic portion having an axially oriented magnetic field, said magnetic portion defining an axially oriented surface that varies continuously in an axial direction as a function of angular position of said transducer element; and said sensor is mounted axially proximate said axially oriented surface so that said axially oriented surface and said sensor define a continuously variable air gap therebetween.

7. An absolute encoder for determining the position of a movable workpiece including a rotationally driven element, said absolute encoder comprising:

a movable transducer element adapted for coupling to said rotationally driven element, said transducer element having a characteristic profile comprising a magnetic field strength profile that varies substantially continuously as a function of the angular position of said transducer element;

a fixed sensor positioned to sense said characteristic profile to produce a substantially continuous output signal representative of the angular position of said transducer element; and said transducer element further defining an axis of rotation and comprising a disk-shaped magnetic portion having a longitudinal axis parallel to said axis of rotation, said magnetic portion having a radially oriented magnetic field, said magnetic portion defining a radially oriented surface that varies continuously in a radial direction as a function of angular position of said drive shaft; and sensor is mounted radially proximate said radially oriented surface so that said radially oriented surface and said sensor define a continuously variable air gap therebetween.

8. An absolute encoder for determining the position of a movable workpiece including a linearly driven element, said absolute encoder comprising:

a movable transducer element adapted for coupling to said linearly driven element, said transducer element having a characteristic profile comprising a magnetic field strength profile that varies substantially continuously as a function of the linear position of said transducer element;

a fixed sensor positioned to sense said characteristic profile to produce a substantially continuous output signal representative of the linear position of said transducer element;

said transducer element defining an axis of translation and comprising a magnetic portion having a longitudinal axis parallel to said axis of translation, said magnetic portion having a magnetic field oriented in a first direction transverse to said longitudinal axis, said magnetic portion defining a surface oriented in said first direction that varies substantially continuously in said first direction as a function of linear position of said transducer element; and said sensor is mounted proximate said magnetic portion surface so as to define a continuously variable air gap therebetween.

9. An absolute encoder for determining the position of a movable workpiece, said absolute encoder comprising:

a transducer element coupled to said workpiece for movement with said workpiece, said transducer element having a characteristic profile comprising a predetermined magnetic field strength profile that varies substantially continuously as a function of position along said transducer element;

a fixed sensor positioned to sense said characteristic profile to produce a substantially continuous output signal representative of the position of said transducer element relative to said sensor; and wherein said sensor is mounted proximate a movable surface of said transducer element so that said sensor senses a continuously variable magnetic field intensity received from said transducer element, the magnetic field intensity received by said sensor indicating a position of said transducer relative to said sensor.

10. The absolute encoder of claim 9 wherein said continuously variable magnetic field intensity sensed by said sensor is provided by a continuously variable spacing between said transducer element and said sensor.

* * * * *

UNITED STATES PATENT AND TRADEMARK OFFICE
CERTIFICATE OF CORRECTION

PATENT NO.   : 6,305,234 B1
DATED        : October 23, 2001
INVENTOR(S)  : Edward L. Thies and William F. Dowis It is certified that error appears in the above-identified patent and that said Letters Patent is hereby corrected as shown below:

<u>Column 12,</u>
Line 43, insert -- said -- before the word "sensor".

Signed and Sealed this

Eleventh Day of June, 2002

*Attest:*

*Attesting Officer*

JAMES E. ROGAN
*Director of the United States Patent and Trademark Office*